July 5, 1938.  A. HUET  2,122,422

APPARATUS FOR REDUCING RESISTANCE

Filed Dec. 11, 1934

INVENTOR
ANDRÉ HUET.
BY
ATTORNEY

Patented July 5, 1938

2,122,422

UNITED STATES PATENT OFFICE 2,122,422

APPARATUS FOR REDUCING RESISTANCE

André Huet, Paris, France

Application December 11, 1934, Serial No. 757,026
In France December 19, 1933

3 Claims. (Cl. 244—130)

The present invention has for its object the provision of apparatus for deflecting fluid currents, such as air, which move relatively to, or are created by the movement of, some material body for the purpose, for example, of diminishing the resistance of the fluid to the motion of the body embodying the invention.

A feature of the invention is that for a given shape and weight of a moving body (such as a motor car) and for a given effort applied thereto, its velocity through the fluid may be increased. Corollary features are that a body (such as a train) which it is desired to operate at a certain velocity by the application of a certain effort may have its weight increased, or the mechanical efficiency of a body (such as a locomotive) may be increased.

Various devices designed to reduce resistance opposed by fluid currents have been proposed. It has been suggested, for example, that a moving body be provided with deflectors in front of it, or on its lateral walls, such deflectors being either flat or incurved, either straight or conical. It has also been suggested to have such deflector cooperate with other deflectors, or vanes, arranged parallelly to them.

I have observed that when such deflectors are employed a vacuum is produced behind them which exerts an effect of suction on the streams of deflected fluid and draws them back on the moving body. Consequently, whirls and eddies are created on the parts of the moving body and the deflected fluid itself, as well as solid or liquid particles entrained thereby, is caused to enter the moving body through any apertures it may have rearwardly of the deflectors. The result is that the diminution of the resistance sought for is not attained. I have also discovered that to avoid such unfavorable whirls and eddies, it is not sufficient to merely admit some fluid behind the deflectors to diminish or annul the vacuum, but it is necessary to impart to such fluid a certain direction and a certain pressure, either kinetic or static or both, properly conditioned so as to sustain the deflected currents of fluid.

In accordance with my invention, the resistance opposed by fluid to forward travel of a body therethrough is reduced by deflecting a portion of the fluid, such as air, that is encountered away from the front of the body (or whatever part thereof is to be protected) to divert the fluid around the path of the body to flow along its sides at a distance therefrom so that the streams of deflected fluid form a hollow body or an envelope of air through which the body passes. Further, I sustain the streams of deflected fluid and maintain them in their deflected course along the body to prevent their collapse against the body rearwardly of the deflecting device and their reversion to their original position and direction until the body has passed. This is effected by creating an actual body or shield of air that is located between the hollow body or envelope of air and the material body and which surrounds and moves with the latter. This air body or shield is created from a portion of the air encountered by the moving body, which portion, however, has not been deflected to flow along the sides thereof.

One manner of sustaining the deflected streams of fluid to prevent the premature collapse of the hollow body or envelope of air is to direct currents or jets of air with a certain kinetic energy against the inner surface of the envelope, that is, against the streams of deflected air on the side toward the moving body, preferably at an acute angle thereto. Another method involves the admission of dynamically acting air currents between the streams of deflected fluid and the material body and further the admission of other currents to form a body or shield of air having a static pressure sufficiently higher than that of the deflected air streams so that the air shield surrounding the material body prevents collapse of the hollow air body through which the material body moves.

The apparatus in accordance with my invention comprises a main deflecting surface or surfaces preferably aided by auxiliary jet devices for producing currents of a character to act on the body of deflected fluid by pressure or by reaction to sustain it for the desired length of time. Such a sustaining effect can also be obtained or increased by letting a small part of the fluid pass behind the apparatus to reduce the mechanical losses in the fluid in the dead space caused by the residual velocity of the fluid after the passage of the object therethru. The static pressure in the dead space can thus be maintained so that the deflected streams or body of fluid maintain the desired direction or remain in the desired position for a longer time.

My deflecting apparatus as employed to diminish the resistance to the movement of a body, of whatever shape, is as small as possible and itself offers the least possible resistance to the movement of the body, whether the deflecting device be placed forwardly of the body, along its sides, at its rear, or in several of these locations. The deflecting apparatus functions to turn the currents of air encountered by the body aside from its path as much as possible without modifying their intrinsic qualities and also acts upon a portion of the air, which has not been turned aside, to effect a transformation of its intrinsic energy; that is, to change its static pressure to velocity or vice versa. The changes in the intrinsic qualities of part of the air acted on by the deflecting devices make it possible to sustain the main streams of deflected fluid whether this is accomplished by acting dynamically thereon with jets of increased velocity or by providing a mass or shield of air which has a velocity relatively low compared with that of the body but which air shield has a relatively high static pressure so that its location between the material body and the deflected streams of air sustain them against collapse toward the body. It may be remarked that while "stream-lining" a body against resistance to forward functions properly only for the body speed for which it has been designed and imperfectly at other rates of travel, my methods and apparatus function to produce a shield of air which, being elastic, may conform to the contour of any type of body and automatically changes its size and pressure in accordance with variations in the speed of the body, so that it is always effective to reduce resistance to the movement of the body as intended.

The detailed description which follows and which makes reference to the annexed drawing is given by way of example and will make clear how the invention can be put into practice. In the drawing, Fig. 1 represents diagrammatically the application of the present invention to a vehicle, such as an airplane or an automobile moving through the air.

Figure 3:
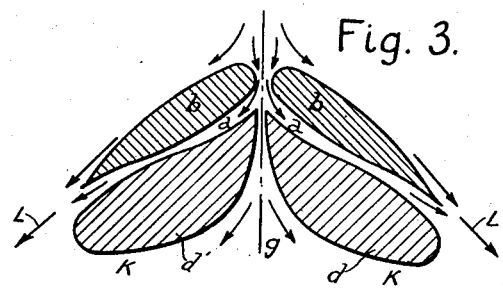
Figures 4, 5:
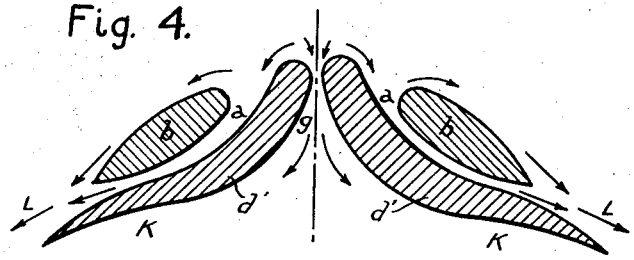

Figs. 3 to 5 inclusive illustrate several forms of deflecting devices for carrying out the invention, these having for their purpose the creation of a body of deflected air of a form on the face toward the object resulting in the reduction of resistance to a minimum.

Figure 6:
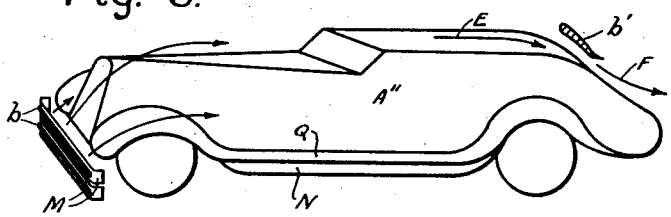

Fig. 6 illustrates in perspective and more or less diagrammatically an automobile whose forward bumper serves as a deflecting surface in accordance with my invention.

Figure 7:
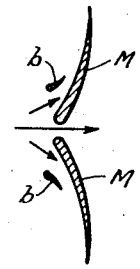

Fig. 7 is a vertical section through deflecting means used in Fig. 6 on an enlarged scale.

Figure 1:
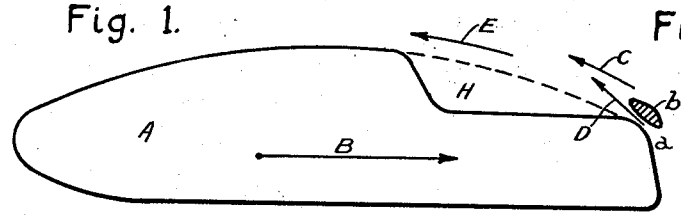

In Fig. 1, there is shown a vehicle A moving in the direction indicated by the arrow B. In the front of, or at any suitable point of the vehicle A, there is arranged a device to carry out the invention, such device as shown in Fig. 1 consisting in a deflecting surface $b$ which is fixed to and preferably separated from the body of the vehicle A so as to form one or more passages "$a$" having the form of a Venturi jet or nozzle. The fluid in which the vehicle moves, for example air, is deflected upward and to the sides of the body A in the direction of the arrows C by the surface $b$. Moreover, the Venturi jet "$a$" will form a current of air issuing therefrom and attacking the deflecting current C at an acute angle as indicated by arrow D tending to sustain the inner surface of the current C on its side toward vehicle A beyond the deflecting member $b$ and will cause such current or body of air to maintain its original form and direction represented by the arrow E so that further rearwardly it will strike the body A tangentially. In the variation shown in Fig. 2, the deflecting surface $b$ is supplemented by an auxiliary surface $d$ which may be unitary with it but which in addition to the jets or nozzles "$a$" forms jets or nozzles "$c$" between the body A and said surface $b$. In this way, a supplementary current G is created from previously undeflected air which current maintains the static pressure in the dead space H located behind the deflecting surfaces. As a result, there is maintained in the dead space H a body of air which moves with the vehicle and offers very little resistance to its movement.

Figure 2B:
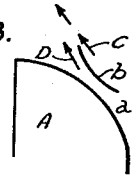
Fig. 2B is a second modification of the deflecting means shown in Fig. 1.
Figure 2:
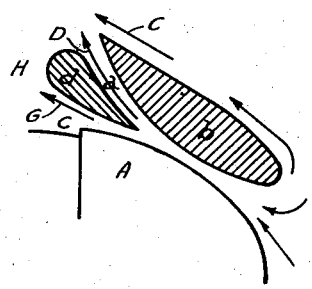
Fig. 2 is a detail illustrating a modified form of deflecting means in accordance with my invention.

In Fig. 2B, I have shown main deflecting surface $b$ in the form of a simple plate which by its proper position relative to the body A produces between such body and itself a jet or nozzle "$a$" of the proper form and direction.

The invention may be applied generally to all parts of the vehicle.

My invention evidently may be applied so as to deflect the air or like fluid below as well as above the moving object. Two deflectors $b$ are then provided. A pair of such deflectors may be used if desired to throw the fluid to the sides of the moving object. Further, any combination of deflectors may be used such as one pair for the top and bottom of an automobile and one pair for the sides, or a pair for the sides and a single one for the top. I have discovered, moreover, that in such cases the resistance to movement of the object through the air is further decreased when a small amount of air is allowed to pass behind the deflecting surfaces to prevent the formation of too low a pressure within the deflected body of air and thereby to avoid a tendency of the deflected body to collapse inwardly too rapidly and also to avoid eddies within the space surrounded by the inner surface of the deflected body of air. The form of the opening made in the deflecting surface to allow this small amount of air to pass will be such that the current on issuing from said opening spreads out in the desired shape. This idea has application also to cases where it is desired to reduce the resistance to movement of a surface at 90° to the direction of the flow of the air, or, at least not parallel to it; for this arrangement will make it possible to have within the body of deflected air a high enough static pressure so that the suction behind the deflectors due to lower pressure within the body of deflected air will be reduced to a minimum. The losses of air due to such suction from the body of deflected air will, moreover, be compensated for. Figs. 3 to 5 represent various forms of deflecting arrangements equipped with jets or nozzles which may be used as desired depending on the form of the body of deflected air to be provided.

In Fig. 3, the deflecting means has two members $d'$ forming with deflecting members $b$, $b$, in addition to the lateral nozzles, $a$, $a$, a central nozzle $g$ which maintains, as stated above, the static pressure in the space K bounded by a body of air deflected by such means, the general outline of the deflected body of air is indicated by the arrows L, it being intended that the moving object to which the deflecting apparatus is applied shall pass through space K.

Fig. 4 shows a similar arrangement but one in which the space defined by the body of deflected air has a much greater lateral spread.

Fig. 5 shows two further variants of the apparatus within the invention. The arrangement illustrated in Fig. 5 has multiple lateral jets with a central jet, comprising parts $d$, $d$ as well as $b$, $b$ and $d'$, $d'$. In this arrangement, a body of deflected air may be provided having the contour indicated by arrows L and which surrounds the space or volume K.

In Figs. 6 and 7, I have illustrated a deflecting arrangement at the front of an automobile employing the front bumper structure as a portion of the deflecting device. As best shown in vertical section Fig. 7, the front bumper of automobile A'' shown in Fig. 6 is divided into two curved portions M, M arranged to assist the special deflecting surfaces $b$ to throw the air impinging thereon to the top and bottom of the automobile to form a body of deflected air surrounding the automobile A' at the top and bottom. Surfaces $b$ are fixed to bumper portions M by means not shown and are spaced therefrom in such a way as to form jets or nozzles assisting in the formation of currents which give the body of deflected air the desired form and the ability to sustain itself for the necessary length of time. The two portions M of the bumper structure are spaced apart vertically as illustrated in Figs. 6 and 7 to permit a small stream of air to pass from the front to the rear of the deflecting structure to prevent the creation of an unduly or undesirably low pressure in the space at the rear of such structure. A deflecting means such as that shown in Fig. 1 placed at the upper edge of the radiator is not illustrated in Fig. 7, but may, of course, be used if desired. As shown, automobile A'' has its front end so formed that air is deflected upwardly thereby sufficiently to avoid substantial impact of air against the upwardly extending parts of the automobile and such front end together with parts $b$ and M of Fig. 6 assures that the inner surface of the body of deflected air forms an envelope around the space thru which the vehicle is moving, thereby achieving a very low air resistance. Similar devices may be used to deflect fluid to the sides of the automobile.

It will be understood that while I have illustrated the jets or nozzles $a$ as placed so that the currents therefrom exert a pressure on the inner surface of the body of deflected air, I may so arrange the jets $a$ as to exert a suction on such body of air. In the latter case, the jet or nozzle $a$ is arranged on the exterior of the principal or main deflecting surface $b$, that is to say, above the deflected currents C in an arrangement such as that illustrated in Fig. 1.

It is evident also that the rear bumper of an automobile can be employed as a deflecting surface when it is desired to place such a surface at the rear end of such a machine.

If apparatus within my invention is arranged with a propelling mechanism, it can, by utilizing the zone where the fluid is compressed by the deflection of the current, prevent cavitation which occurs at high speeds and which materially decreases the efficiency of the propelling apparatus. The apparatus in accordance with my invention can also function in water or any other fluid and will find applications to vehicles either moving in or on such fluids.

While I have described my apparatus as comprising a plurality of features, it will be understood that I do not limit in all cases to using more than one of the above mentioned apparatus features.

What I claim is:

1. Apparatus for reducing resistance opposed by wind currents to the forward movement of a vehicle having a closed front end comprising; deflecting members mounted in transversely spaced relation centrally and forwardly of said closed front end of said vehicle and having surfaces inclined outwardly and rearwardly with respect to its longitudinal axis for deflecting wind currents outwardly away from the path of movement of said vehicle, the spacing of said deflecting members providing an unobstructed orifice opposite the closed front end of said vehicle and the adjacent inner portions of said deflecting members being so shaped that said orifice forms a rearwardly diverging passage for creating in the space behind said deflectors and between the latter and the front of the vehicle a body of air of higher static pressure than exists in the deflected wind currents for maintaining them away from the front of the vehicle.

2. Apparatus for reducing resistance opposed by wind currents to the forward movement of a vehicle having a closed front end comprising; deflecting members mounted in transversely spaced relation centrally and forwardly of said closed front end of said vehicle and having convex surfaces inclined outwardly and rearwardly with respect to its longitudinal axis for deflecting wind currents outwardly away from the path of movement of said vehicle, the spacing of said deflecting members providing an unobstructed orifice opposite the closed front end of said vehicle and the adjacent inner portions of said deflecting members being so shaped that said orifice forms a rearwardly diverging passage for creating in the space behind said deflectors and between the latter and the front of the vehicle a body of air of higher static pressure than exists in the deflected wind currents for maintaining them away from the front of the vehicle.

3. Apparatus for reducing resistance opposed by wind currents to the forward movement of a vehicle having a closed front end comprising; deflecting members mounted in transversely spaced relation centrally and forwardly of said closed front end of said vehicle and having surfaces inclined outwardly and rearwardly with respect to its longitudinal axis for deflecting wind currents outwardly away from the path of movement of said vehicle, the spacing of said deflecting members providing an unobstructed orifice opposite the closed front end of said vehicle and the adjacent inner portions of said deflecting members being so shaped that said orifice forms a rearwardly diverging passage for creating in the space behind said deflectors and between the latter and the front of the vehicle a body of air of higher static pressure than exists in the deflected wind currents for maintaining them away from the front of the vehicle; and supplemental deflecting members mounted adjacent each of said first mentioned deflecting members and arranged to cooperate therewith for forming Venturi-like passages for directing jets of air against the inner surfaces of the wind currents deflected by said first deflected members.

ANDRÉ HUET.